June 22, 1943. H. J. MANKOFF 2,322,460
ROTOR FOR FEED GRINDING MACHINES
Filed Jan. 12, 1942 2 Sheets-Sheet 1

INVENTOR.
HENRY J. MANKOFF
BY
E. G. Charles
atty.

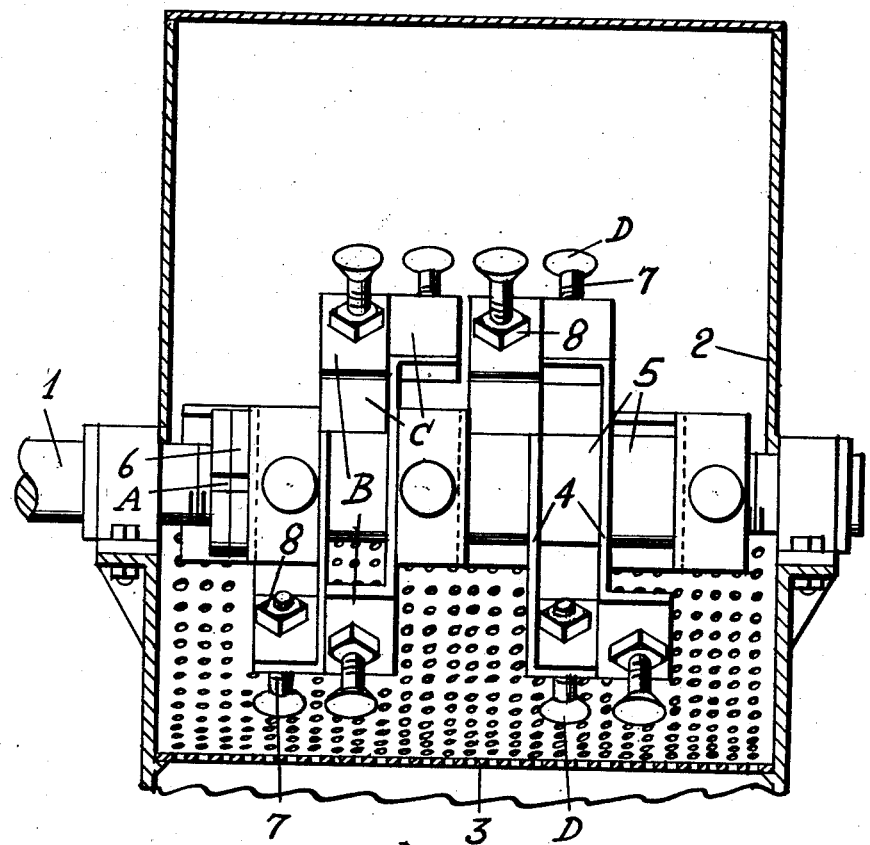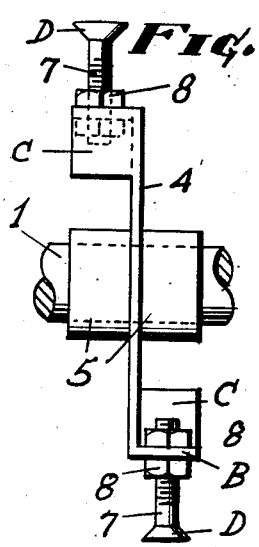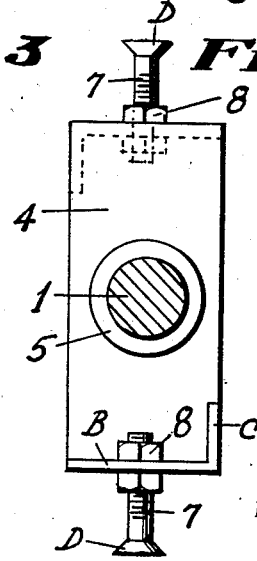

Patented June 22, 1943

2,322,460

UNITED STATES PATENT OFFICE 2,322,460

ROTOR FOR FEED GRINDING MACHINES

Henry J. Mankoff, Wichita, Kans.

Application January 12, 1942, Serial No. 426,441

3 Claims. (Cl. 83—11)

This invention relates to certain new and useful improvements in feed grinding machines, and has for its principal object to grind the feed in such a way as to avoid a meal product, in other words, substance such as hay fed into the machine will be cut or broken in short lengths sufficient to pass through the screen by fan suction, and the apertures of the screen being of sufficient diameter to permit a free passage of the comminuted hay therethrough. Being so arranged, constant rotation of the comminuted portions of the hay will be avoided, and the finished product free from dust or meal.

A further object of this invention is to produce a grinding rotor having a series of bars secured to a shaft in spaced relation and the bars having hammers on each end thereof that radially extend and being adjustable horizontally to move the head toward and from the concavity of the screen. Consequently the length of the comminuted particles of hay may be governed, there being ample room between the screen and the ends of the bars to vary the position of the hammer heads at the discretion of the operator for a desired grading of the ground substance. Furthermore, the projection of the hammers can be so finely adjusted that a perfect balance of the cylinder is maintained to avoid vibration. The adjustable features of the hammers may be adapted for cracking or coarsely comminuting grain, and by the use of a screen that is finely apertured, grain may be reduced to a meal of a desired comminution.

These and other objects will hereinafter be more fully explained, reference being had to the accompanying drawings forming a part of this specification, and in which like characters will apply to like parts in the different views.

Referring to the drawings:

Fig. 2 is a side elevation of the rotor and section of the screen, parts removed for convenience of illustration.

Fig. 3 is an edge view of one of the hammer supporting bars, fragmentary portion of the rotor shaft, and separators for the bars.

Fig. 4 is a side view of the bar looking with the axis of the shaft.

Figure 1:
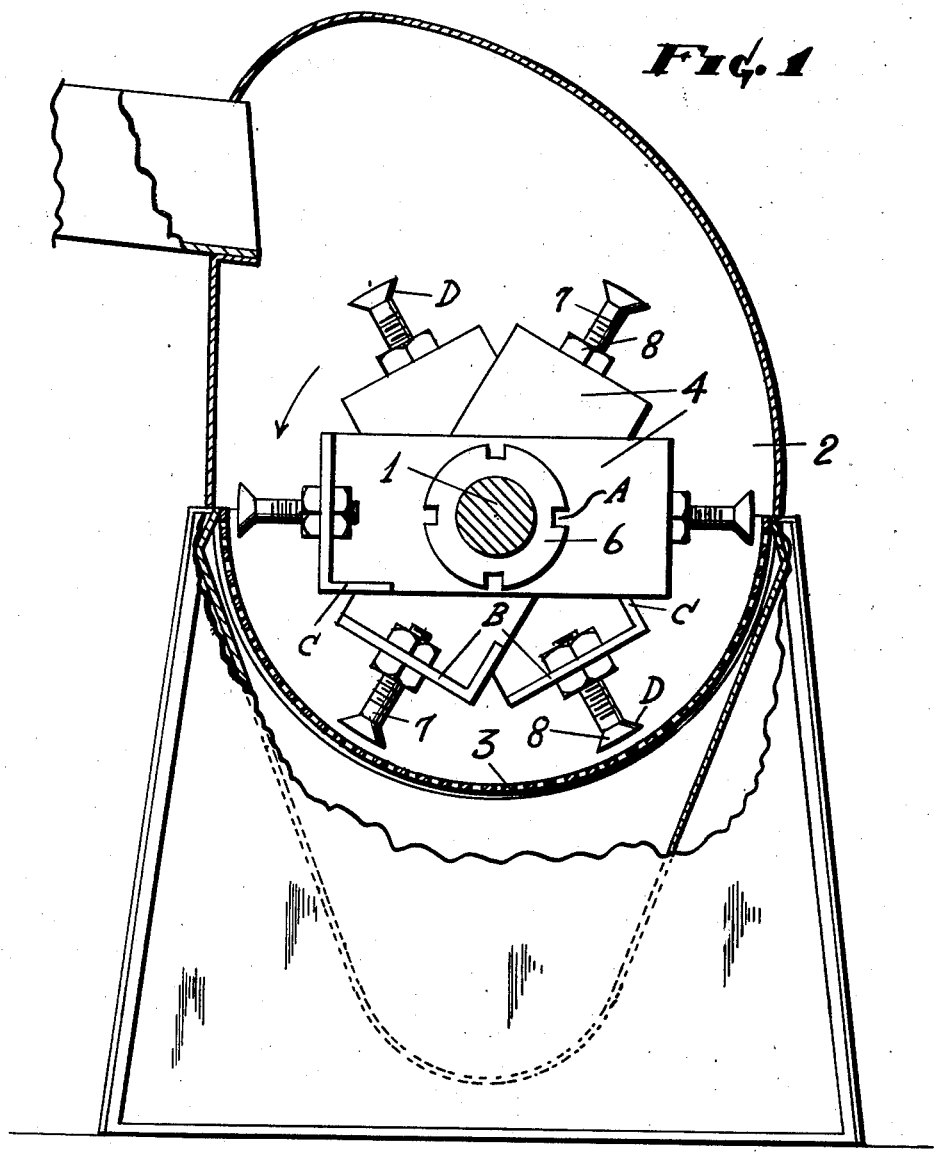
Fig. 1 is a sectional view through the turning axis of the rotor, illustrating one position of the hammer heads in working relation to the screen.

The objects of this invention are supported by the novel construction of a grinding rotor consisting of a shaft 1 that is journalled in an adequate casing 2, in which is positioned likewise an apertured concave or screen 3 through which comminuted substance is forced by a suction fan to a place of storage, the shaft to have an appropriate sheave or pulley and power means to turn the same, (the fan, storage and pulley not being illustrated in the drawings as any conventional type of such structure may be employed).

Positioned on the shaft is a series of bars 4 centrally bored to engage snugly thereon, the bars being spaced apart by nipples 5 of a desired length that likewise fit snugly on the shaft, and clamped together by lock nuts 6 threadedly engaging on the shaft, the nuts illustrated being notched as at A for a spanner wrench or punch to turn the same for snug engagement, or to remove the bars, it being understood that the series of bars will turn independently on the shaft prior to the tightening of the nuts for the purpose of obliquely crossing each other for a spiral position of the projecting ends, whereby alternate engagement of the bar ends may be had in their course of action upon grain or hay.

An outer portion of both ends of each bar has a right angle bend as at B and being braced by a web C at one end of the bar, said bent portions B each being centrally bored through which a cylindrical shaft or shank 7 of the hammer will engage, the shaft being threaded to receive inwardly and outwardly positioned nuts 8 to lock the shaft at a desired extension, and the said shaft has on its outer extremity a circular cutting head with a conical back as at D while the outer face is slightly convex to conform to the radii of the screen. The head being so constructed, is means to avoid an outward thrust toward the screen while the conical form will tend to retract against centrifugal force; therefore hay that is being ground will be restrained from a severe centrifugal contact with the screen while being chopped by the circular head. Furthermore should the advancing side of the head become worn away the shaft of the hammer may be turned to renew the cutting ability of the hammer. Attention is also directed that the conical form of the head is also a means to maintain an edge-like extension until it has reached the shaft.

It will be seen that the bar and its respective hammers constitute a unit as an element of a grinding rotor, and are replaceable and interchangeable.

Having fully described the improvements of this invention what is claimed as new and desired to secure by Letters Patent is:

1. In a rotor for a feed grinding machine, a shaft, a series of bars rockably carried on the shaft to spirally position their outer extremities throughout the series as positioned for consecutive engagement as the rotor turns, spacing means for the bars, and lock nuts to threadedly engage on the shaft to bind the bars and spacing means together and rotatable with the shaft, each bar having an outer portion thereof bent at right angle to the bar body, said bent portions oppositely extending and having a web to brace the same, said right angle portions being apertured, and a hammer having a cylindrical threaded shank to engage in each aperture and lock nuts to secure the hammer against longitudinal movement and at a desired extension from its respective bent portion.

2. As an element of a grinding rotor, a bar centrally bored to engage on a shaft, each end of the bar having a portion thereof bent at right angle and a web to brace the bent portion to the bar body, said right angle bent portion being apertured, a hammer having a cylindrical threaded shank to engage in the aperture, and lock nuts to secure the shank at a desired projection axial of the bar, the shank having a circular head on its outer terminal end, the back of the head to where it joins the shank being conical, all as and for the purpose specified.

3. In combination for use on a grinding rotor, a bar centrally bored to engage on a shaft, each end of the bar having a portion thereof bent at right angle, said right angle bent portion being apertured, a hammer having a cylindrical threaded shank to engage in the aperture, and lock nuts to secure the shank at a desired projection axially of the bar, the shank having a circular head on its outer terminal end, the back of the head to where it joins the shank being conical, all as and for the purpose specified.

HENRY J. MANKOFF.